United States Patent
Martini et al.

(10) Patent No.: US 8,627,734 B2
(45) Date of Patent: Jan. 14, 2014

(54) PRESTRESSING UNIT

(75) Inventors: Harald Martini, Herzogenaurach (DE); Fritz Wiesinger, Kammerstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 576 days.

(21) Appl. No.: 12/423,327

(22) Filed: Apr. 14, 2009

(65) Prior Publication Data

US 2009/0260945 A1 Oct. 22, 2009

(30) Foreign Application Priority Data

Apr. 15, 2008 (DE) .......................... 10 2008 018 846

(51) Int. Cl.
*F16H 25/12* (2006.01)
(52) U.S. Cl.
USPC ................................ 74/56; 192/93 A; 74/567
(58) Field of Classification Search
USPC ...... 192/35, 84.7, 92 R–92 C; 74/55, 56, 567; 476/40–46
See application file for complete search history.

(56) References Cited

U.S. PATENT DOCUMENTS

| | | | | |
|---|---|---|---|---|
| 2,737,792 A | * | 3/1956 | Dyer | 464/46 |
| 2,771,977 A | * | 11/1956 | Uher | 192/93 R |
| 3,000,479 A | * | 9/1961 | Mosbacher | 192/35 |
| 4,213,521 A | * | 7/1980 | Modersohn | 192/18 R |
| 5,485,904 A | | 1/1996 | Organek et al. | |
| 5,620,072 A | | 4/1997 | Engle | |
| 5,806,646 A | * | 9/1998 | Grosspietsch et al. | 192/70.252 |
| 5,810,141 A | * | 9/1998 | Organek et al. | 192/35 |
| 6,705,442 B1 | * | 3/2004 | Patridge | 192/15 |
| 2003/0042105 A1 | * | 3/2003 | Kummer et al. | 192/93 R |
| 2005/0109574 A1 | * | 5/2005 | Kushino | 192/35 |
| 2011/0100780 A1 | * | 5/2011 | Jurjanz et al. | 192/93 A |

FOREIGN PATENT DOCUMENTS

| | | | |
|---|---|---|---|
| DE | 1425257 A1 | 10/1968 | |
| DE | 4106503 C1 | 8/1992 | |
| DE | 10252974 A1 | 7/2003 | |
| DE | 10 2004 015 271 | 10/2004 | |
| DE | 10342013 A1 | 5/2005 | |
| DE | 102006006640 B3 | 4/2007 | |
| DE | 10 2005 053 555 | 8/2007 | |
| FR | 2623580 A1 | 5/1989 | |
| JP | 06129444 A | * 5/1994 | F16D 13/64 |
| WO | 2009109255 A2 | 9/2009 | |

* cited by examiner

*Primary Examiner* — William C Joyce
*Assistant Examiner* — Terence Boes
(74) *Attorney, Agent, or Firm* — Lucas & Mercanti, LLP

(57) ABSTRACT

A prestressing unit which has a first ramp disk and a second ramp disk. Ramp contours are formed in one side of an annular face of the ramp disks. In the prestressing unit, the rolling bodies ascend and/or descend on the ramp contours as a result of rotational pivoting of one of the ramp disks in relation to the other ramp disk about an axis. The ramp contours are each formed as a single-part running face for the rolling bodies. The running face is inclined with respect to the axis.

13 Claims, 4 Drawing Sheets

PRESTRESSING UNIT

This application claims the priority of DE 10 2008 018 486.8 filed Apr. 15, 2008, which is incorporated by reference herein.

FIELD OF THE INVENTION

The invention relates to a prestressing unit. In particular, the invention relates to a prestressing unit having a first ramp disk and a second ramp disk, which both have a plurality of ramp contours formed in one side of an annular face of the ramp disks. A rolling body is arranged between the respective ramp contours of the first ramp disk and of the second ramp disk. In the prestressing unit, the rolling bodies ascend and/or descend on the ramp contours as a result of rotational pivoting of at least one of the two ramp disks in relation to the other ramp disk.

BACKGROUND OF THE INVENTION

Such prestressing units are used in transmissions of motor vehicles in order, in particular, to permit a friction clutch in the drive train of a motor vehicle to be activated.

German patent DE 10 2005 053 555 B3 discloses an axial adjustment device in the form of a ball ramp arrangement. The axial adjustment device comprises two disks which are centered on a common axis, one of which is supported axially and the other can be displaced axially, and at least one of which disks can be driven in rotation. The two disks each have an equal number of ball grooves running in the circumferential direction on their end faces facing one another. The two disks are therefore mounted with balls as rolling bodies.

U.S. Pat. No. 5,485,904 likewise discloses a prestressing unit whose ramp disks are arranged such that they can rotate with respect to one another by means of balls as rolling bodies.

Likewise, U.S. Pat. No. 5,620,072 discloses a prestressing unit for a multidisk clutch whose ramp disks are also arranged such that they can rotate with respect to one another with balls as rolling bodies.

German patent DE 10 2004 015 271 B4 discloses a torque transmission device. Here, the rolling bodies and the axial bearing are mounted on a pitch circle which has the same diameter. Balls are used as the rolling bodies.

An axial prestressing unit is also used for prestressing multidisk clutches of the superimposition stages in the bevel differential gears.

SUMMARY OF THE INVENTION

The invention is based on the object of providing a cost-effective prestressing unit which has reduced weight and is designed to take up radial forces and/or axial forces.

The prestressing unit according to the invention comprises a first ramp disk and a second ramp disk. The two ramp disks have a plurality of ramp contours formed in one side of an annular face of the ramp disks. In terms of the application of force it is particularly advantageous that at least three rolling bodies are arranged distributed between the two ramp disks. The ramp contours are formed in the ramp disks themselves in accordance with the rolling bodies which are provided between the ramp disks. In the prestressing unit, the rolling body ascends and/or descends on the ramp contours as a result of rotational pivoting of at least one of the two ramp disks in relation to the other ramp disk. As a result, axial travel is obtained between the two ramp disks. The ramp contours each have a single-part running face for the rolling bodies formed in them. The running face is inclined with respect to the axis about which one of the two ramp disks can be rotated in relation to the other ramp disk.

The running faces have an initial contact point and an end contact point formed in them for the rolling bodies. In this context, an end stop is formed on the end contact point for the rolling bodies. The end stop is formed at the lowest point of the raceway.

The prestressing unit comprises a cage for holding the rolling bodies, wherein the second ramp disk holds at least the cage together with the rolling bodies and the first ramp disk against one another in a positively locking fashion. The cage for holding the rolling bodies can be rotatably pivoted with respect to the at least one ramp disk.

The first ramp disk is connected to an actuating element by means of which the first ramp disk can be rotatably pivoted.

The rolling bodies may be formed as rollers or truncated cones. The running faces are formed in such a way that they have a constant inclination with respect to the axis. Another possibility is for the running faces to have a variable inclination for the rolling bodies with respect to the axis.

It is particularly advantageous if three rolling bodies are arranged distributed uniformly between the ramp disks. If the rolling bodies are distributed uniformly, the individual rolling bodies are at an angular distance of 120° from one another. In this context, each of the two ramp disks has three ramp contours. In each case a ramp contour is provided for each rolling body. The ramp contours are each formed from the rolling faces.

A further advantage is that, as a result of the saving in material, the ramp disks are lower in weight than ramp disks from the prior art. The ramp disks may be manufactured, for example, from a strip of sheet metal material. In particular, the use of rollers or truncated cones as rolling bodies permit the use of thin-walled ramp disks.

It is of particular advantage if at least the two ramp disks can be manufactured as cold worked components made from a sheet metal blank. In the process, the ramp contours, the running faces, the end contact point and the initial contact point are formed. The running faces of the ramp contours should be hardened such that they are suitable for rolling at least for the rolling body.

Cold-formable steel of the type "16MnCr5" has proven advantageous as the material for the sheet metal blanks. Cold-formable steel of the type "C45" is also advantageous as the material for the sheet metal blanks, in which case the formed sheet metal blanks have to be hardened before being subjected to mechanical loading in the prestressing unit. For a person skilled in the art it is self-evident which hardening method is most suitable for this.

The components of the prestressing unit are preferably joined to form one premounted unit. It is also advantageous if the components of the prestressing unit comprise, as a premounted unit, at least the first ramp disk and the second ramp disk and the cage between the ramp disks.

BREIF DESCRIPTION OF THE DRAWING

In the text which follows, exemplary embodiments will explain in more detail the invention and its advantages with reference to the appended figures, of which:

DETAILED DESCRIPTION OF THE INVENTION

Although the following description of the prestressing unit 1 refers to the use of three rollers as rolling bodies 3 between the ramp disks 2, 5, this is not intended to be interpreted as being a restriction of the invention. As can already be inferred from the preceding description, three to five rollers can be arranged between the first and second ramp disks 2, 5. In addition, it is to be noted that the same reference symbols are used for the same elements in the various figures.

Figure 1:
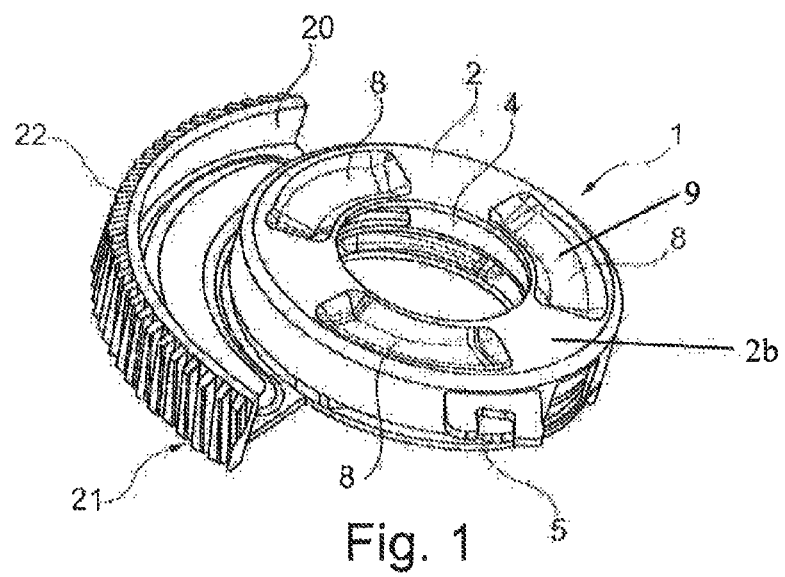
FIG. 1 is a perspective view of the prestressing unit according to the invention.

FIG. 1 shows a perspective view of the prestressing unit 1 according to the invention. The prestressing unit 1 is composed essentially of a first ramp disk 2, a second ramp disk 5 and a cage 4 for rolling bodies 3. The two ramp disks 2 and 5 have a plurality of ramp contours 8 extending from one side of an annular face 2a, 5a of the ramp disks 2 and 5. The first ramp disk 2 and the second ramp disk 5 also have a second annular face 2b, 5b, respectively jsee FIG. 4). The ramp contours 8 form depressions 9 in the second annular faces 2b, 5b. One rolling body 3 each (see FIG. 4) is arranged between the respective ramp contours 8 of the first ramp disk 2 and the second ramp disk 5. The rolling bodies 3 are held in the cage 4. The first ramp disk 2 is connected to an actuating element 20 by means of which the first ramp disk 2 can be rotatably pivoted. Corresponding mechanical parts of the transmission engage on the actuating element 20. The actuating element has a toothing system 22 formed on its outer contour 21. The actuating element 20 is in the shape of a circular sector in this embodiment. It is self-evident for a person skilled in the art that the actuating element 20 can also be configured differently.

Figure 2:
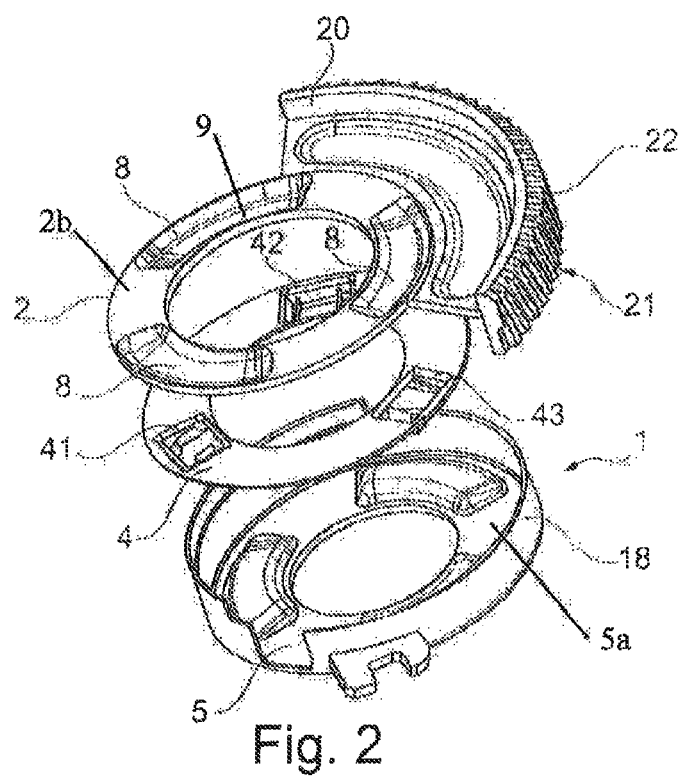
FIG. 2 is an exploded illustration of the prestressing unit according to the invention.

FIG. 2 is a perspective view of the exploded illustration of the prestressing unit 1. As is apparent from this illustration, the prestressing unit 1 is composed essentially of a first ramp disk 2, a cage 4 and a second ramp disk 5. In the further description, the invention is described with three roller bearings. Likewise, three ramp contours 8 are formed in the ramp disks 2 and 5. However, this is not to be understood as being a restriction of the invention. The cage 4 consequently has three receptacles $4_1$, $4_2$, and $4_3$ for the roller bearings 3. In the embodiment illustrated here, the roller bearings 3 are embodied as rollers (see FIG. 4). The cage 4 is adjoined by the first and second ramp disks 2 and 5. The angle W (see FIG. 6) of the raceway 10 is controlled by means of the inclination of the ramp contours 8. As a result it is possible to take up radial forces of the prestressing unit 1. The forces can be applied via the actuating element 20. The inclination and the forces may be constant as well as variable. For a person skilled in the art it is self-evident that the forces can also be taken up by means of a truncated cone. In the case of overloading, the ramp disks are guided radially via a radial flange 18 of the second ramp disk 5.

Since the cage 4 has receptacles $4_1$, $4_2$, and $4_3$ for three rollers, three ramp contours 8 are therefore impressed in the first ramp disk 2. The first ramp disk 2 is preferably formed from a sheet metal blank or a punch-pressed part which is manufactured by means of cold forming.

The second ramp disk 5 has the radial flange 18 which is formed in one part with the ramp disk 5. A plurality of ramp contours 8 are likewise formed in the second ramp disk 5. The second ramp disk 5 is optionally a drawn punch-pressed component made of a forging blank or sheet metal blank. The second ramp disk 5 can alternatively be flow pressed from the previously mentioned blanks. The cage 4 and the first ramp disk 2 are held together to form a premounted unit by means of the radial flange 18.

Figure 3:
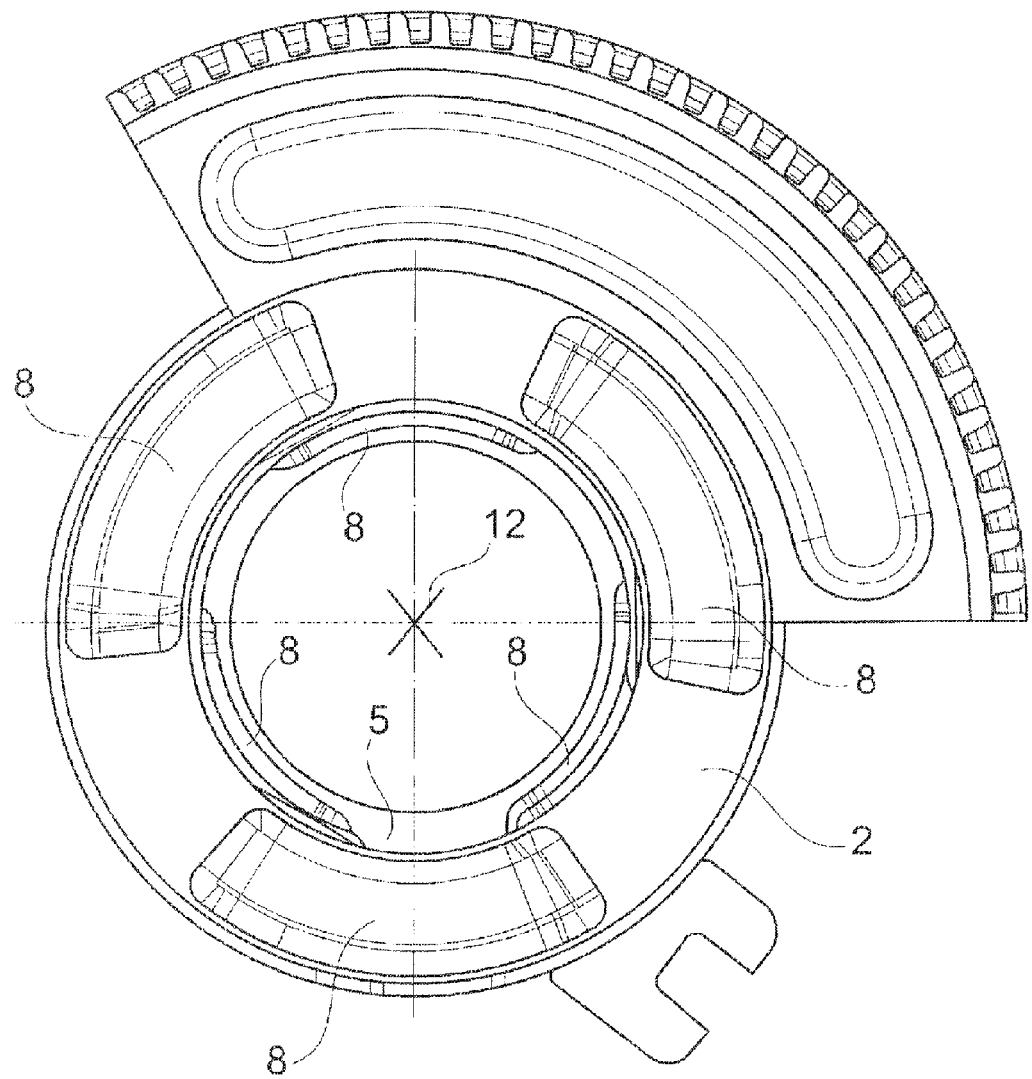
FIG. 3 is a plan view of the prestressing unit according to the invention.

FIG. 3 shows a plan view of the prestressing unit 1 according to the invention. The first ramp disk 2 is arranged such that it can rotate or pivot about an axis 12. Distributed in a radially symmetrical fashion, the ramp contours 8 are formed in the first and also in the second ramp disk 2 and 5. In the illustration shown in FIG. 3, the first ramp disk 2 is rotated with respect to the second ramp disk 5 in such a way that the rolling bodies 3 (not illustrated here) each bear against the highest point of the ramp contour 8.

Figure 4:
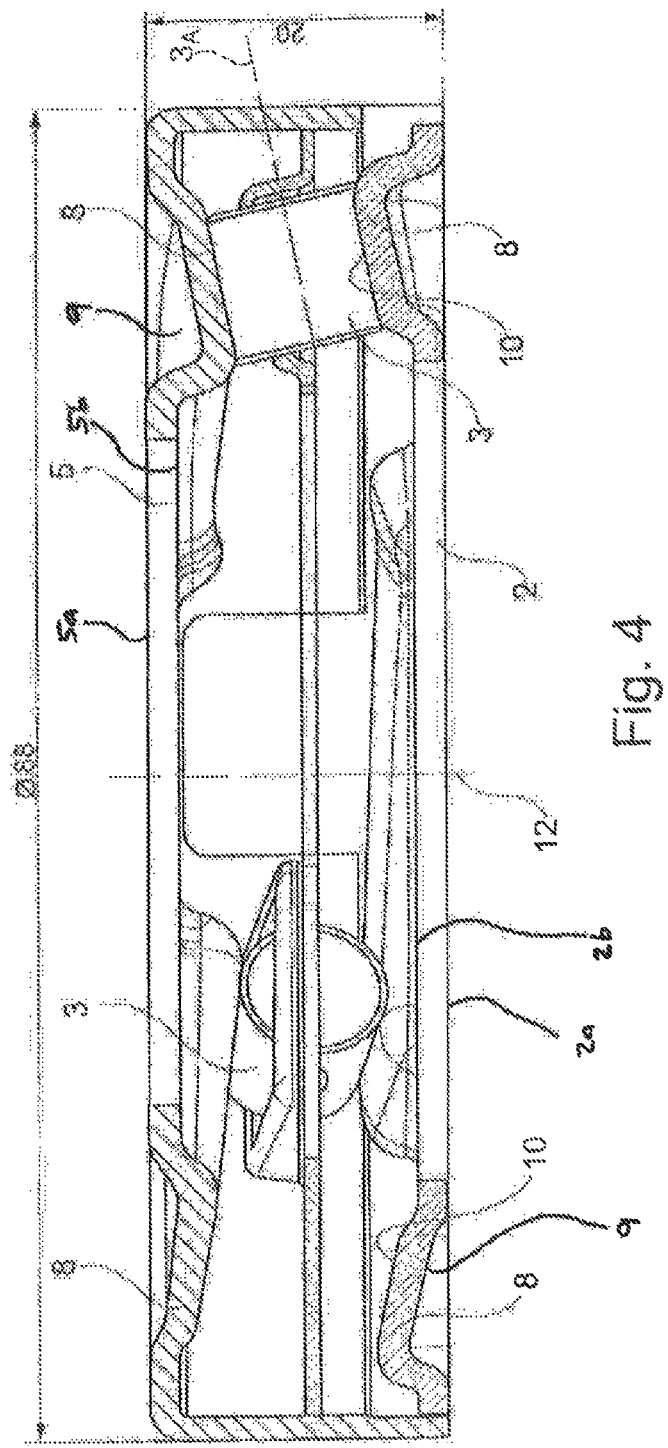
FIG. 4 is a sectional view of the prestressing unit according to the invention in which the rolling bodies are located between the two ramp disks at the highest point of the ramp contour.

FIG. 4 is a sectional view of the prestressing unit 1 according to the invention, in which the rolling bodies 3 are located between the two ramp disks 2 and 5 at the highest point of the respective ramp contour 8. The ramp contours 8 each have a single-part running face 10 formed in them for the rolling bodies 3. The running face 10 is inclined with respect to the axis 12. An axis $3_A$ of the respective rolling body 3 is therefore also inclined with respect to the axis 12 of the prestressing unit 1. The rolling bodies 3 are embodied as rollers in this embodiment. The rollers are positioned at the respective highest point of the respectively assigned ramp contour 8. The prestressing unit 1 has therefore reached the maximum stroke. In the embodiment illustrated here, the prestressing unit 1 has a diameter of 88 mm. At the maximum stroke, the prestressing unit 1 reaches a thickness of 20 mm.

Figure 5:
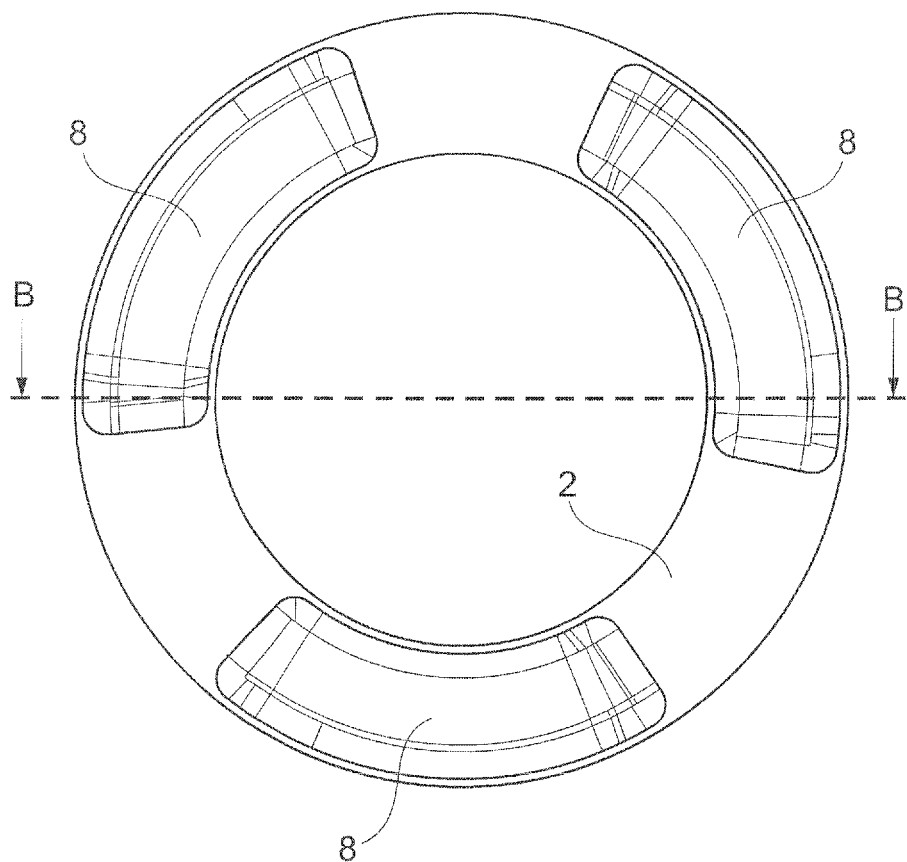
FIG. 5 is a plan view of the first ramp disk.

FIG. 5 shows a plan view of the first ramp disk 2. The three ramp contours 8 are formed in the first ramp disk 2, and consequently also in the second ramp disk 5.

Figure 6:
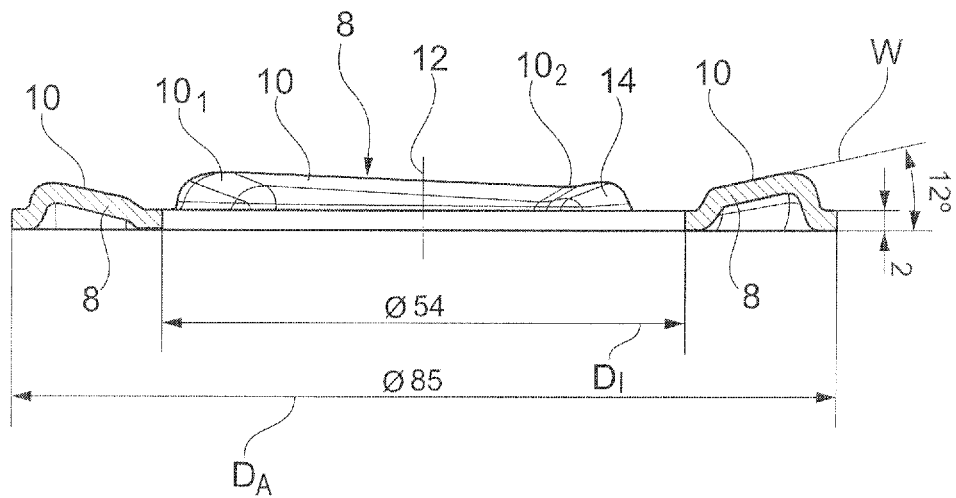
FIG. 6 is a sectional view of the first ramp disk along the sectional line B-B shown in FIG. 5.

FIG. 6 is a sectional view of the first ramp disk 2 along the sectional line B-B in FIG. 5. The running faces 10 can be shaped in such a way that they have constant inclination with respect to the axis 12. It is also possible for the running faces 10 to have a variable inclination with respect to the axis 12. The running faces 10 have an initial contact point $10_1$ and an end contact point $10_2$ for the rolling bodies 3. At the end contact point $10_2$, an end stop 14 is formed for the rolling bodies 3. The end stop 14 is formed at the lowest point of the raceway 10. In the embodiment illustrated here, the first ramp disk 2 has an external diameter $D_A$ of 85 mm, and an internal diameter $D_T$ of 54 mm. The material thickness of the ramp disk 2 is 2 mm. Likewise, each of the running faces 10 has an inclination of 12°. For a person skilled in the art it is self-evident that the dimensions specified here are not to be interpreted as being a restriction on the invention.

The invention has been described with reference to a preferred embodiment. For a person skilled in the art it is self-evident that changes and modifications can be made to the invention without departing from the scope of protection of the dependent claims.

The invention claimed is:

1. A prestressing unit, comprising:
    a first ramp disk having a front side with a first annular face and a back side and a second ramp disk having a front side with a second annular face and a back side, the second annular face facing the first annular face,
    the first ramp disk having a plurality of first ramp contours projecting outward from the first annular face toward the second annular face and forming depressions opposite the first ramp contours on the back side of the first ramp disk, and the second ramp disk having a plurality of second ramp contours projecting outward from the second annular face toward the first annular face and forming depressions opposite the second ramp contours on the back side of the second ramp disk;

each of the first ramp contours and second ramp contours forming running faces, and cylindrical rolling bodies arranged between the first ramp contours and the second ramp contours, such that the rolling bodies rise and/or fall on the running faces of the first ramp contours and the second ramp contours when the first ramp disk and second ramp disk pivot relative to each other about an axis; and wherein the running faces are inclined relative to a plane of the first annular face and a plane of the second annular face in a radial direction.

2. The prestressing unit according to claim 1, wherein the running faces have a constant inclination with respect to the axis.

3. The prestressing unit according to claim 1, wherein the running faces have a variable inclination with respect to the axis.

4. The prestressing unit according to claim 1, wherein the running faces have an initial contact point and an end contact point for the roiling bodies, and an end stop is formed at the end contact point for the rolling bodies.

5. The prestressing unit according to claim 4, wherein the end stop is formed at a lowest point of the running faces relative to the respective one of the first annular face and the second annular face.

6. The prestressing unit according to claim 1, wherein the prestressing unit comprises a cage for holding the rolling bodies, and the second ramp disk holds at least the cage together with the rolling bodies and the first ramp disk against one another in a positively locking fashion.

7. The prestressing unit according to claim 6, wherein the cage for holding the rolling bodies can be rotatably pivoted with respect to the first ramp disk or the second ramp disk.

8. The prestressing unit according to claim 1, wherein the first ramp disk is connected to an actuating element by means of which the first ramp disk can be rotatably pivoted.

9. The prestressing unit according to claim 1, wherein the first ramp disk has three first ramp contours and the second ramp disk has three second ramp contours, and three rolling bodies are arranged and distributed uniformly between three ramp contours formed on the first ramp disk and the second ramp disk.

10. The prestressing unit according to claim 1, wherein the first ramp disk and the second ramp disk are cold worked components made from a sheet metal blank, and cold forming of the sheet metal blank forms the ramp contours, the running faces with an initial contact point, an end contact point and an end stop for the rolling bodies.

11. The prestressing unit according to claim 10, wherein the components of the ramp contours are hardened at least on the running faces for the rolling bodies such that the components are suitable for rolling.

12. The prestressing unit according to claim 1, wherein components of the prestressing unit are combined to form a pre-mounted unit.

13. The prestressing unit according to claim 12, wherein the components of the prestressing unit comprise, as a pre-mounted unit, at least the first ramp disk and the second ramp disk and a cage between the first ramp disk and the second ramp disk.

* * * * *